United States Patent
Barton

(10) Patent No.: US 7,779,437 B2
(45) Date of Patent: Aug. 17, 2010

(54) METHOD FOR ENHANCING DIGITAL VIDEO RECORDER TELEVISION ADVERTISING VIEWERSHIP

(75) Inventor: James M. Barton, Los Gatos, CA (US)

(73) Assignee: TiVo Inc., Alviso, CA (US)

( * ) Notice: Subject to any disclaimer, the term of this patent is extended or adjusted under 35 U.S.C. 154(b) by 1227 days.

(21) Appl. No.: 09/740,618

(22) Filed: Dec. 18, 2000

(65) Prior Publication Data

US 2001/0049820 A1    Dec. 6, 2001

Related U.S. Application Data

(60) Provisional application No. 60/171,829, filed on Dec. 21, 1999.

(51) Int. Cl.
*H04N 7/10* (2006.01)
*H04N 5/445* (2006.01)
*H04N 7/16* (2006.01)

(52) U.S. Cl. .............. 725/32; 725/37; 725/135

(58) Field of Classification Search .............. 358/908; 386/1, 68; 725/32–36, 22–23, 135, 37
See application file for complete search history.

(56) References Cited

U.S. PATENT DOCUMENTS

| | | |
|---|---|---|
| 4,233,628 A | 11/1980 | Ciciora |
| 4,306,250 A | 12/1981 | Summers et al. |
| 5,121,476 A | 6/1992 | Yee |
| 5,233,423 A | 8/1993 | Jernigan et al. |
| 5,247,364 A | 9/1993 | Banker et al. |
| 5,271,626 A | 12/1993 | Llenas et al. ............... 273/430 |
| 5,400,401 A | 3/1995 | Wasilewski et al. |
| 5,428,400 A | 6/1995 | Landis et al. |

(Continued)

FOREIGN PATENT DOCUMENTS

DE     44 34 034 A1    3/1996

(Continued)

OTHER PUBLICATIONS

Gales, Ron, "Creatives Find Bookends a Solution to Viewer Apathy," Jan. 2, 1989, ADWEEK Eastern Edition, v30, n1, p. 43.*

(Continued)

*Primary Examiner*—James Sheleheda
(74) *Attorney, Agent, or Firm*—Hickman Palermo Truong & Becker LLP; Kirk D. Wong

(57) ABSTRACT

A method for enhancing digital video recorder television advertising viewership provides a method wherein the first or last number of seconds of a commercial break are carefully authored to provide a "teaser" to entice the viewer to watch multiple commercials during the commercial break instead of skipping the commercial break using the fast forward or jump functions of the DVR. A bookending function displays an advertisement before and/or after a program that has been recorded on the DVR's storage device is played to the viewer. The viewer selects a recorded program from the DVR's storage device to playback. Before the program is played back, an advertisement is retrieved from the storage device and is displayed before the program is run. Another advertisement is retrieved and then played after the program is over.

9 Claims, 9 Drawing Sheets

U.S. PATENT DOCUMENTS

| | | | |
|---|---|---|---|
| 5,481,296 A | 1/1996 | Cragun et al. | |
| 5,537,151 A | 7/1996 | Orr et al. | |
| 5,600,364 A | 2/1997 | Hendricks et al. | |
| 5,614,940 A | 3/1997 | Cobbley et al. | |
| 5,623,588 A | 4/1997 | Gould | |
| 5,627,936 A | 5/1997 | Prasad et al. | |
| 5,648,824 A | 7/1997 | Dunn et al. | |
| 5,659,539 A | 8/1997 | Porter et al. | |
| 5,659,653 A | 8/1997 | Diehl et al. | |
| 5,781,227 A * | 7/1998 | Goode et al. | 725/32 |
| 5,790,935 A | 8/1998 | Payton | |
| 5,805,763 A | 9/1998 | Lawler et al. | |
| 5,838,314 A | 11/1998 | Neel et al. | |
| 5,855,008 A | 12/1998 | Goldhaber | |
| 5,867,205 A | 2/1999 | Harrison | |
| 5,878,141 A | 3/1999 | Daly et al. | |
| 5,892,536 A | 4/1999 | Logan et al. | |
| 5,930,493 A | 7/1999 | Ottesen et al. | |
| 5,974,218 A * | 10/1999 | Nagasaka et al. | 386/46 |
| 5,987,210 A | 11/1999 | Iggulden et al. | |
| 6,008,802 A | 12/1999 | Iki et al. | |
| 6,061,056 A | 5/2000 | Menard et al. | |
| 6,072,982 A * | 6/2000 | Haddad | 725/93 |
| 6,094,677 A | 7/2000 | Capek et al. | |
| 6,097,441 A | 8/2000 | Allport | |
| 6,100,941 A * | 8/2000 | Dimitrova et al. | 348/700 |
| 6,163,316 A | 12/2000 | Killian | |
| 6,169,542 B1 * | 1/2001 | Hooks et al. | 715/719 |
| 6,177,931 B1 | 1/2001 | Alexander et al. | |
| 6,177,938 B1 | 1/2001 | Gould | |
| 6,181,364 B1 * | 1/2001 | Ford | 725/32 |
| 6,185,574 B1 | 2/2001 | Howard et al. | |
| 6,215,491 B1 | 4/2001 | Gould | |
| 6,219,052 B1 | 4/2001 | Gould | |
| 6,229,532 B1 | 5/2001 | Fujii | |
| 6,236,801 B1 * | 5/2001 | Engle et al. | 386/52 |
| 6,243,741 B1 | 6/2001 | Utsumi | |
| 6,266,094 B1 | 7/2001 | Taylor, Jr. | |
| 6,304,852 B1 * | 10/2001 | Loncteaux | 705/14 |
| 6,313,854 B1 | 11/2001 | Gibson | |
| 6,335,730 B1 | 1/2002 | Gould | |
| 6,351,596 B1 | 2/2002 | Ostrover | |
| 6,393,158 B1 | 5/2002 | Gould et al. | |
| 6,400,407 B1 | 6/2002 | Zigmond et al. | |
| 6,404,977 B1 | 6/2002 | Iggulden | |
| 6,473,903 B2 * | 10/2002 | Balakrishnan et al. | 725/135 |
| 6,546,556 B1 | 4/2003 | Kataoka et al. | |
| 6,574,416 B1 * | 6/2003 | Posa et al. | 386/69 |
| 6,615,270 B2 | 9/2003 | Gould et al. | |
| 6,621,980 B1 | 9/2003 | Gould et al. | |
| 6,698,020 B1 * | 2/2004 | Zigmond et al. | 725/34 |
| 6,788,882 B1 * | 9/2004 | Geer et al. | 386/116 |
| 6,799,327 B1 * | 9/2004 | Reynolds et al. | 725/42 |
| 6,909,837 B1 | 6/2005 | Unger | |
| 7,055,166 B1 | 5/2006 | Logan et al. | |
| 7,114,170 B2 | 9/2006 | Harris et al. | |
| 7,467,218 B2 | 12/2008 | Gould et al. | |
| 2001/0052135 A1 * | 12/2001 | Balakrishnan et al. | 725/135 |
| 2002/0010775 A1 * | 1/2002 | Rakavy et al. | 709/224 |
| 2002/0120925 A1 | 8/2002 | Logan | |
| 2002/0124255 A1 * | 9/2002 | Reichardt et al. | 725/42 |
| 2002/0144262 A1 | 10/2002 | Plotnick et al. | |
| 2002/0184047 A1 | 12/2002 | Plotnick et al. | |
| 2002/0191950 A1 | 12/2002 | Wang | |
| 2003/0088872 A1 | 5/2003 | Maissel et al. | |
| 2003/0154128 A1 | 8/2003 | Liga | |
| 2003/0184679 A1 | 10/2003 | Meehan | |
| 2004/0103429 A1 | 5/2004 | Carlucci et al. | |
| 2004/0210824 A1 | 10/2004 | Shoff et al. | |
| 2004/0268384 A1 | 12/2004 | Stone | |
| 2005/0076359 A1 | 4/2005 | Pierson et al. | |
| 2005/0262539 A1 | 11/2005 | Barton et al. | |
| 2005/0273828 A1 | 12/2005 | Barton | |
| 2005/0278747 A1 | 12/2005 | Barton et al. | |
| 2006/0136980 A1 | 6/2006 | Fulcher et al. | |
| 2007/0300249 A1 | 12/2007 | Smith et al. | |
| 2007/0300250 A1 | 12/2007 | Smith et al. | |
| 2009/0297122 A1 | 12/2009 | Barton | |
| 2010/0080529 A1 | 4/2010 | Barton | |

FOREIGN PATENT DOCUMENTS

| | | | | |
|---|---|---|---|---|
| EP | 0817486 A | 1/1998 | | |
| EP | 1 367 588 A | 12/2003 | | |
| WO | WO 92/22983 | 12/1992 | | |
| WO | WO 96/08921 | 3/1996 | | |
| WO | WO 98/03016 | 1/1998 | | 7/16 |
| WO | WO 99/30493 | 6/1999 | | 7/10 |
| WO | WO 00/10327 A | 2/2000 | | |
| WO | WO 01/47279 | 6/2001 | | 7/26 |
| WO | WO 01/47279 A | 6/2001 | | |
| WO | WO 02/19710 A | 3/2002 | | |

OTHER PUBLICATIONS

"Audi ads focus on technology," Nov. 1, 1993, Automotive News, v0, n0, p. 2.*

*Metabyte Announces Personalized TV Software*; PR Newswire, Jan. 21, 1999.

International Preliminary Examining Authority, "Notification of Transmittal of International Preliminary Examination Report," Apr. 2, 2002, 13 pages.

Current Claims of International Application No. PCT/US00/34819, 4 pages.

State Intellectual Property Office of PRC "The first Office Action", mailed Mar. 13, 2009, serial No. 200480033609.3, Applicant: Tivo Inc., 14 pages.

Current Claims for SIPO PRC application No. 200480033609.3, (10 pages).

European Patent Office, "European Search Report", EPO application No. 09013842.1 - 1522.

Office Action from EPO for foreign patent application No. 07021583.5 dated Feb. 7, 2008 (9 pages).

Current claims of EPO patent application No. 07021583.5 Feb. 2008 (2 pages).

Office Action from EPO for foreign application No. 07021582.7 dated Feb. 15, 2008 (9 pages).

Current claims of EPO patent application No. 07021582.7 Feb. 2008 (4 pages).

European Patent Office, "European Search Report," foreign application No. PCT/US06/24688, dated Jul. 11, 2008 (11 pages).

Claims, foreign application No. PCT/US06/24688, Jul. 2008 (13 pages).

Office Action from EPO for foreign patent application No. 00966775.9-2202 dated Apr. 20, 2007 (3 pages).

Current claims in EPO patent application No. 00966775.9-2202 Apr. 2007 (14 pages).

Official Action from EPO for foreign application No. 99 909 867.6-2202 dated Dec. 27, 2005 (5 pages).

Current claims in EPO patent application No. 99 909 867.6-2202 Dec. 2005 (9 pages).

* cited by examiner

METHOD FOR ENHANCING DIGITAL VIDEO RECORDER TELEVISION ADVERTISING VIEWERSHIP

CROSS-REFERENCE TO RELATED APPLICATION

This application is related to and claims the benefit of priority from 60/171,829 filed Dec. 21, 1999, entitled "NAME SEARCH"; the entire content of which is incorporated by this reference for all purposes as if fully disclosed herein.

BACKGROUND OF THE INVENTION

1. Technical Field

The invention relates to the storing and viewing of television program material in a computer environment. More particularly, the invention relates to increasing the visibility of television advertisements in a computer environment.

2. Description of the Prior Art

The introduction of Digital Video Recorders (DVR) have revolutionized the television recording industry. DVRs store program material onto a storage medium that is easily accessible, reusable, and the recording does not degrade over time as with video tapes.

DVRs give the viewer an unprecedented amount of control over how the viewer watches live and recorded television programs. One of the effects of the DVRs is that as viewers watch television programs stored on the DVR's storage medium, they have a tendency to skip over the commercial breaks.

Television broadcasters and advertisers have a negative viewpoint of the advent of the DVR. The feeling is that the DVR is destroying any purpose of advertising on the broadcast medium. Primetime no longer exists because viewers are not tied to the broadcaster's schedule. DVRs allow the viewer to easily store all of his desired programs for later viewing.

Broadcasters generate their revenue through the value of the commercial spots. Advertisers feel that they are losing their potential viewership "eyes." If advertisers do not believe that there is any value in a primetime commercial spot, then the broadcasters lose large proportions of their revenue.

On the other hand, DVR service providers also generate revenue through commercials. There is an extremely large potential market for specialized advertising that is shown directly to the target audience. DVRs have the ability to evaluate the viewer's viewing preferences and make inferences as to the viewer's lifestyle. With this personal information the DVR service providers can directly target the correct audience for advertisers.

It would be advantageous to provide a method for enhancing digital video recorder television advertising viewership that allows broadcasters to retain and improve the value of a certain portion of television commercial breaks. It would further be advantageous to provide a method for enhancing digital video recorder television advertising viewership that allows DVR service providers to present advertisements to viewers that do not usurp the broadcaster's advertising space.

SUMMARY OF THE INVENTION

The invention provides a method for enhancing digital video recorder television advertising viewership. The system allows the broadcaster to retain and improve the value of a certain segment of television commercial breaks. In addition, the invention provides a system that allows the Digital Video Recorder (DVR) service provider to present advertisements to viewers that do not usurp the broadcaster's advertising space.

A client device, typified in application Ser. No. 09/126, 071, owned by the Applicant, provides functionality typically associated with the present generation of DVRs, such as the storage of a large amount of video content, ability to choose and play this content on demand, and full "VCR-like" control of the delivery of the content.

The invention provides a method wherein the first or last number of seconds of a commercial break are carefully authored to provide a "teaser" to entice the viewer to watch multiple commercials during the commercial break instead of skipping the commercial break using the fast forward or jump functions of the DVR. This teaser can be a set of images or logos that indicate a commercial relating to that advertiser is present or a menu or short sequence of animations to designed catch the viewer's attention and persuade him to watch the commercial break.

Further, advertisers can also place the more important content in the first or last number of seconds of their commercials. This content will get the desired message across to the viewer in those seconds.

The invention also provides a bookending function that displays an advertisement before and/or after a program that has been recorded on the DVR's storage device is played to the viewer. The viewer selects a recorded program from the DVR's storage device to playback. Before the program is played back, an advertisement is retrieved from the storage device and is displayed before the program is run. Another advertisement is retrieved and then played after the program is over.

The invention's bookending allows any ad material that is loaded onto the system to be displayed before and/or after any program material. Since the DVR system knows the viewer's program preferences (e.g., science fiction, police dramas) and, possibly, the viewer's personal information (e.g., male, age 27, likes photography), ads can be selected based on this information and targeted to the specific audience that the viewer is a part of.

Other aspects and advantages of the invention will become apparent from the following detailed description in combination with the accompanying drawings, illustrating, by way of example, the principles of the invention.

DETAILED DESCRIPTION OF THE INVENTION

The invention is embodied in a method for enhancing digital video recorder television advertising viewership in a computer environment. A system according to the invention allows the broadcaster to retain and improve the value of a certain segment of television commercial breaks. In addition, the invention provides a system that allows the Digital Video Recorder (DVR) service provider to present advertisements to viewers that do not usurp the broadcaster's advertising space.

Figure 1:
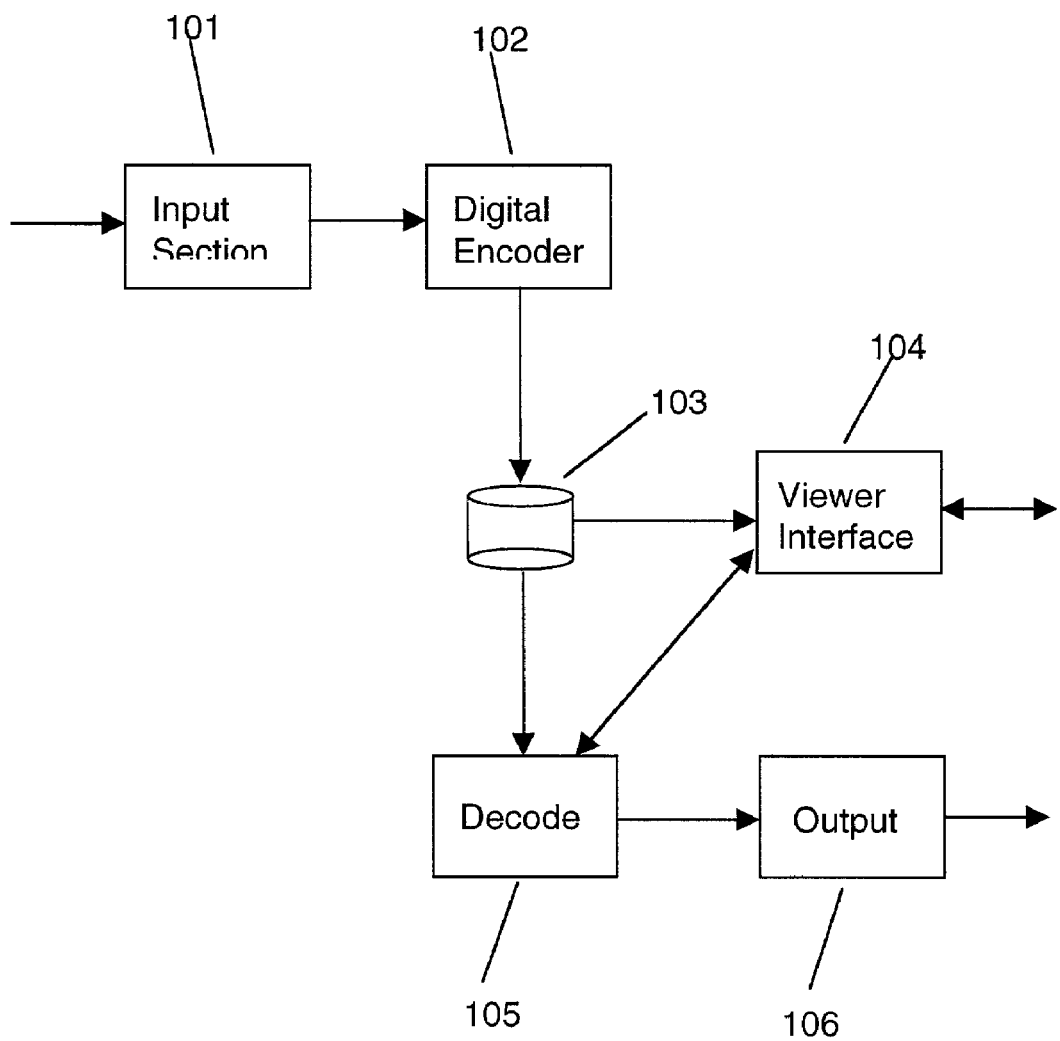
FIG. 1 is a block schematic diagram of a preferred embodiment of a digital video recording system according to the invention.

Referring to FIG. 1, time-shifting devices, or DVRs, take as input television broadcast signals from multiple signal sources. One such method is described in application Ser. No. 09/126,071 entitled "Multimedia Time Warping System" owned by the Applicant. The input Section 101 selects the input source and directs the signal to the Digital Encoder 102. If the signal source is analog, the Digital Encoder 102 converts the analog signal to a digital form, e.g., MPEG2. For digital signals such as digital satellite feeds, the Digital Encoder 102 can directly store the digital signal or convert the digital signal to a different sample rate.

Digital signals are stored on a persistent storage device 103, e.g., a magnetic hard disk or RAM device. Multiple programs are stored on the storage device 103 and are easily accessed by the viewer. The viewer selects the desired program stored on the storage device 103 through the Viewer Interface 104.

The selected program is accessed from the storage device 103 and decoded into analog form for presentation onto a television set by the Decode module 105. If the display is a digital monitor, for example, the Decode module 105 converts the stored program into the proper digital format. The Output module 106 presents the Decode module's 105 output into an acceptable signal format (analog or digital) to the viewer's television or monitor.

Figure 2:
FIG. 2 is a diagram of a screenshot of a user interface menu listing recorded programs according to the invention.
Figure 3:
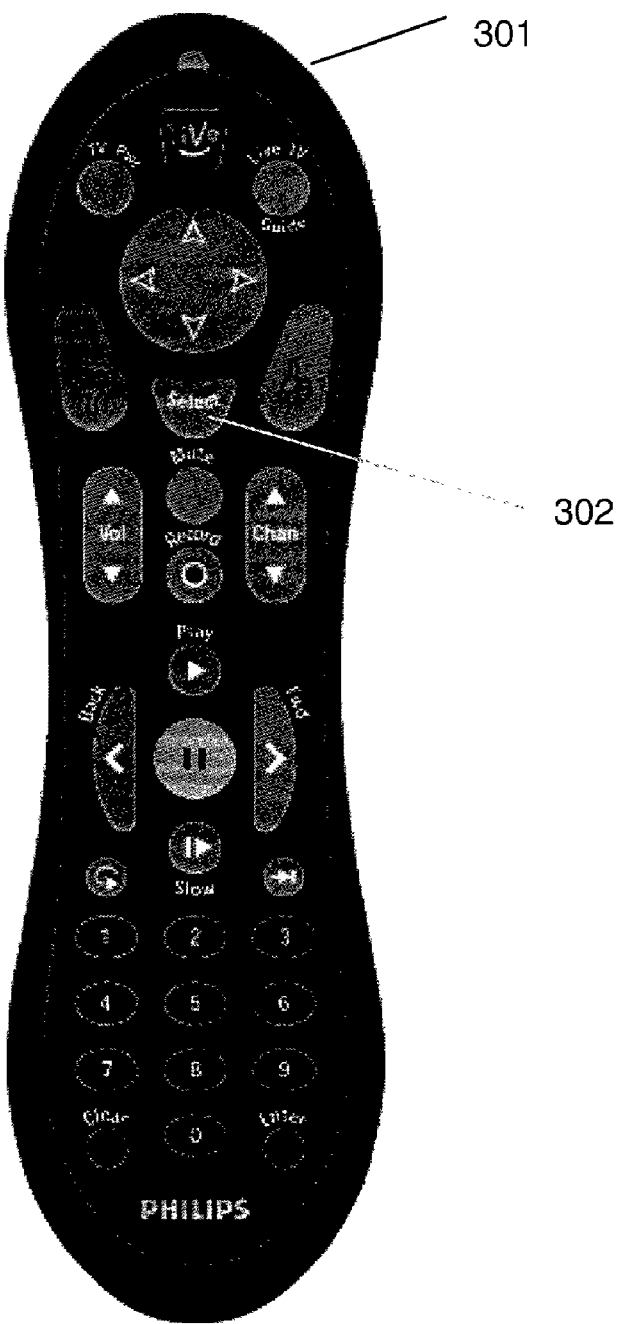
FIG. 3 is a diagram of an exemplary remote input device according to the invention.

With respect to FIGS. 2 and 3, the invention presents the viewer with a list 201 of the programs stored on the storage device. The viewer highlights the desired program using a remote input device 301. The program is then selected when the viewer presses the select button 302. Each program is randomly accessible, a program may be viewed and deleted irrespective of its recorded sequence. This is unlike video cassette tapes that do not give the viewer the convenience of easily accessing a particular recorded program on a tape or inserting new recordings amidst a populated tape.

Figure 4:
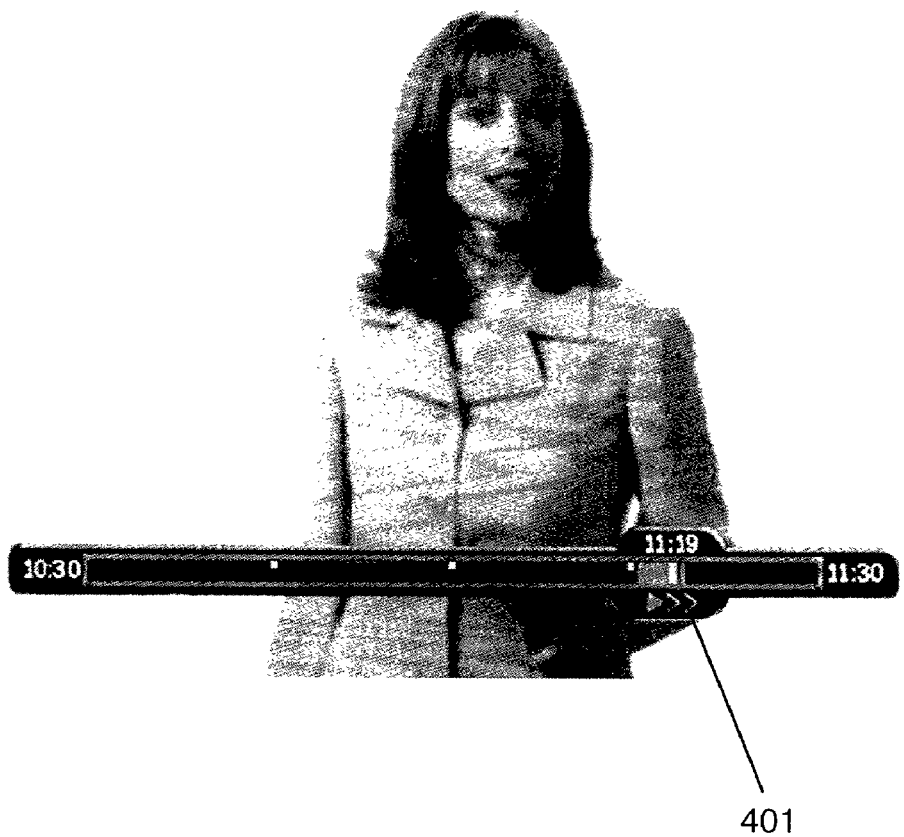
FIG. 4 is a diagram of a screenshot of a program playback mode according to the invention.

Referring to FIG. 4, DVRs allow the viewer to perform many trick play functions 401 on the program being viewed. The viewer can fast forward and rewind at multiple speeds, pause, single step, slow play, etc. through the program material.

The invention of time-shifting devices for television programs has also created the opportunity for television viewers to fast-forward through commercial advertisements if the viewer is watching a recorded program, or a live, cached program where the current viewing position is delayed from the current real-time television broadcast.

Since there is little economic incentive for viewers to watch commercials in those cases, the value of the space made available for advertising drops precipitously. However, in examining the behavior of viewers, it is apparent that a newly valuable advertising space has been created at the beginning or ending of a commercial break.

Figure 5:
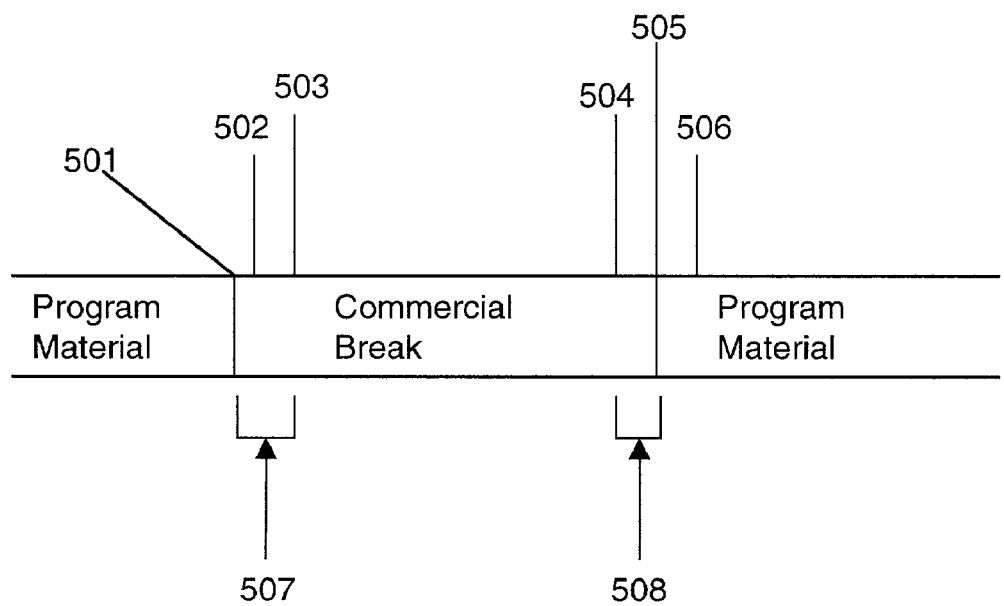
FIG. 5 is a block schematic diagram showing a viewer's response to a commercial break within a program according to the invention.

With respect to FIG. 5, a preferred embodiment of the invention provides a method for enhancing the viewership of television ads on a DVR by taking into account the viewer's interaction with the inherent operation of the DVR. Whether the technique is a visual fast-forward (TiVo) or fixed-time (e.g., 30 seconds) skip function (ReplayTV), there is a delay from when the viewer realizes 502 that the program material has ended and advertising has begun 501, and when the viewer starts skipping the commercial using the remote input device 503. Several factors are involved in the viewer's response time. The viewer must first recognize 502 that the program material has ended 501. Once the viewer realizes that the event has occurred, he must then press a button 503 on the remote input device.

Often, the time span 507 from the end of the program 501 to the point where the viewer has pressed the button 503 is tenths of seconds long. Thus, the first few seconds of any commercial break become extremely valuable as an opportunity to get the viewer to NOT skip the commercial break. Advertisers will pay additional money for the opportunity to occupy this space in the commercial breaks.

Similarly, when fast-forwarding or skipping, it is typical that the viewer will not be able to precisely skip to the beginning of the program material 505. When examining viewer behavior, most viewers will skip forward 506, then back up 504 into the preceding commercial break a few seconds in order to view all of the program material from the point where it starts 505. Therefore, the last few seconds of a commercial break 508 become extremely valuable, since it is an opportunity to persuade the viewer to rewind into the commercial break and view advertisements.

Figure 6:
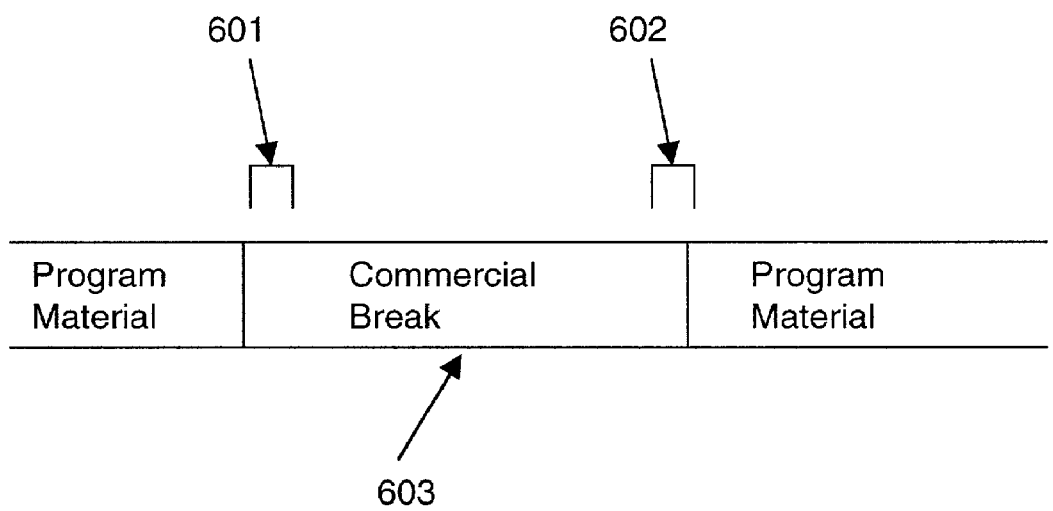
FIG. 6 is a block schematic diagram showing the important portions of a commercial break according to the invention.

Referring to FIG. 6, the invention provides a method wherein the first few seconds 601 or last few 602, are carefully authored to provide a "teaser" to entice the viewer to watch multiple commercials during the break 603. This teaser might be a set of images or logos that indicate a commercial relating to that advertiser is present or a menu or short sequence of animations designed to catch the viewer's attention and persuade him to watch the commercial break.

Figure 7:
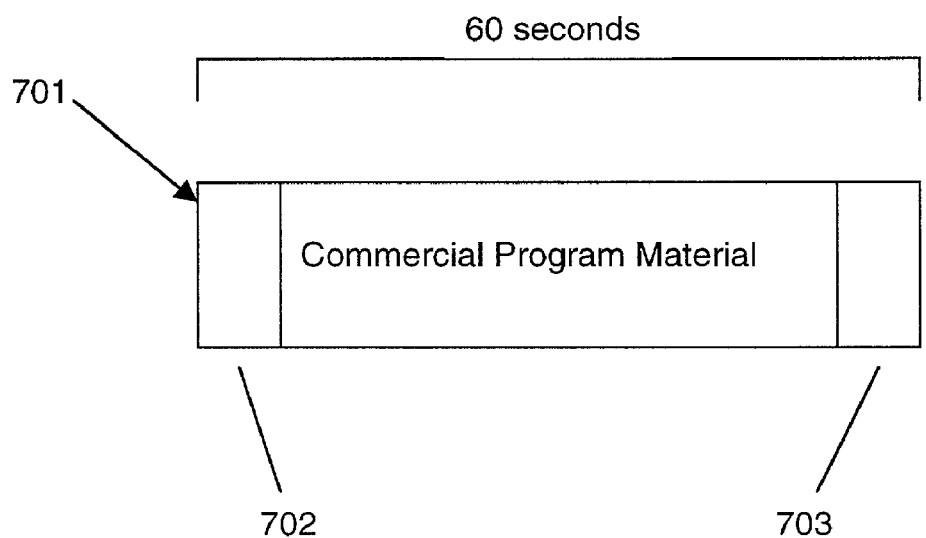
FIG. 7 is a block schematic diagram showing the important portions of a commercial according to the invention.

With respect to FIG. 7, advertisers can also place the more important content in the first 702 or last 703 number of seconds of their commercials 701. This content will be able to get the desired message across to the viewer in those seconds. Given this model, content providers are able to charge advertisers a higher rate to place their commercials at the beginning or the end of a commercial break.

Further, one can imagine using the CC tagging technology as described in application Ser. No. 09/665,921 entitled "Closed Caption Tagging System" owned by the Applicant, or similar technology such as ATVEF or Wink, to automatically pause the program being watched immediately at the beginning (or end) of the commercial break, with the frame being displayed containing a menu of the advertisements in the commercial break. The viewer might simply skip forward, or choose a particular commercial via a menu-like overlay on top of the broadcast image using the on screen display (OSD).

Another method used is described in application Ser. No. 09/187,967 entitled "Analog Video Tagging and Encoding System." The network content provider authors an invisible tag at the beginning of the "pod" (the sequence of ad avails) that tells a decoder (such as TiVo's Time Warping System) what all the commercials in the pod are, thereby allowing the decoder to display an instant menu of ads.

Further, it is possible using the CC tagging technology, or similar techniques, to cause an "auto-pause" capability. For example, instead of presenting a menu, a short "teaser" image or multi-frame video could introduce an advertisement, and then automatically pause. The viewer might hit "play" to watch the advertisement or fast-forward to skip to the next advertisement, which would present a similar teaser and then pause. With a just few button presses, the viewer could skip the commercial break and start the program, or watch one or more advertisements in the break.

As noted above, the invention stores program material on a storage medium. A viewer accesses the programs through a user menu. The viewer selects the desired program by highlighting the appropriate program and pressing the select button. Once the program is selected, it is then displayed.

Figure 8:
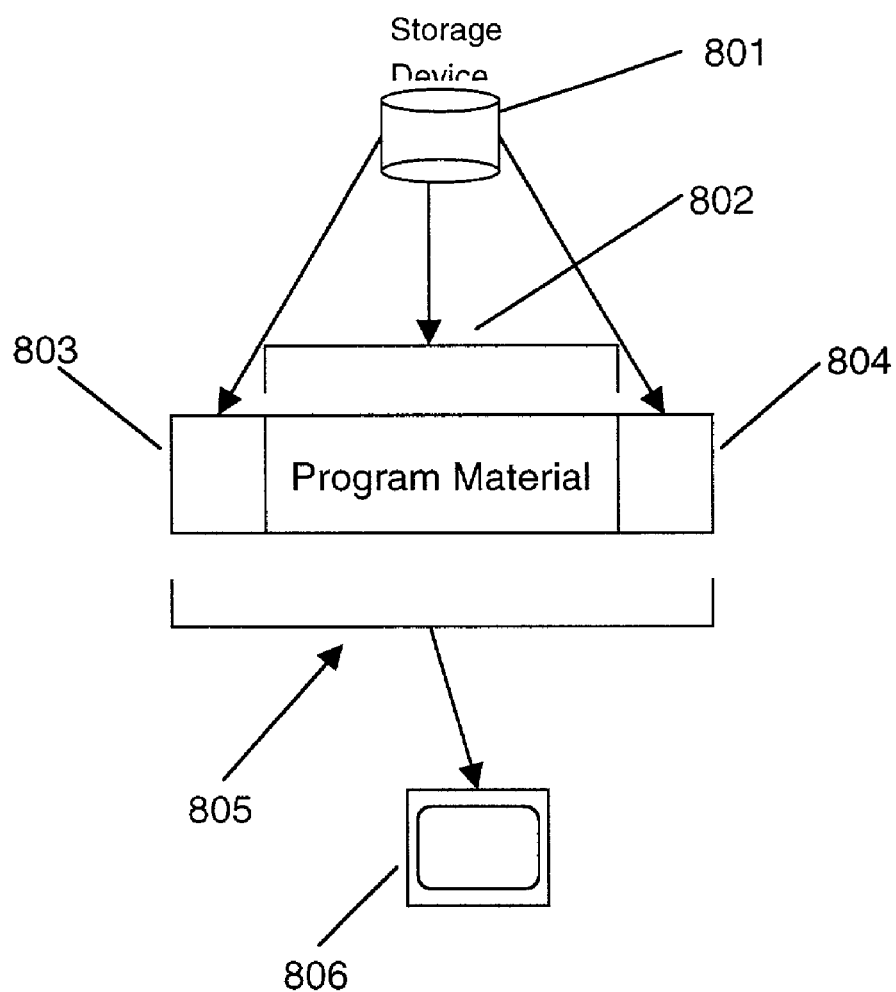
FIG. 8 is a block schematic diagram of a preferred embodiment of the invention showing the bookending concept according to the invention.

Referring to FIG. 8, "bookending" concerns the display of the program material 802. The program 802 is indexed and retrieved from the Storage Device 801. Before the program 802 is displayed an ad 803 is first displayed before the program is run. Another ad 804 is then played after the program is over. The invention's bookending allows any ad material that is loaded onto the system to be displayed before and/or after any program material. The ads and program material 805 are displayed to the viewer 806.

The ads are stored on the Storage Device 801, indexed and, optionally, stored along with the characteristics of each ad. The choice is up to the DVR system or provider as to whether an ad is played before, after, or both before and after any program material.

Figure 9:
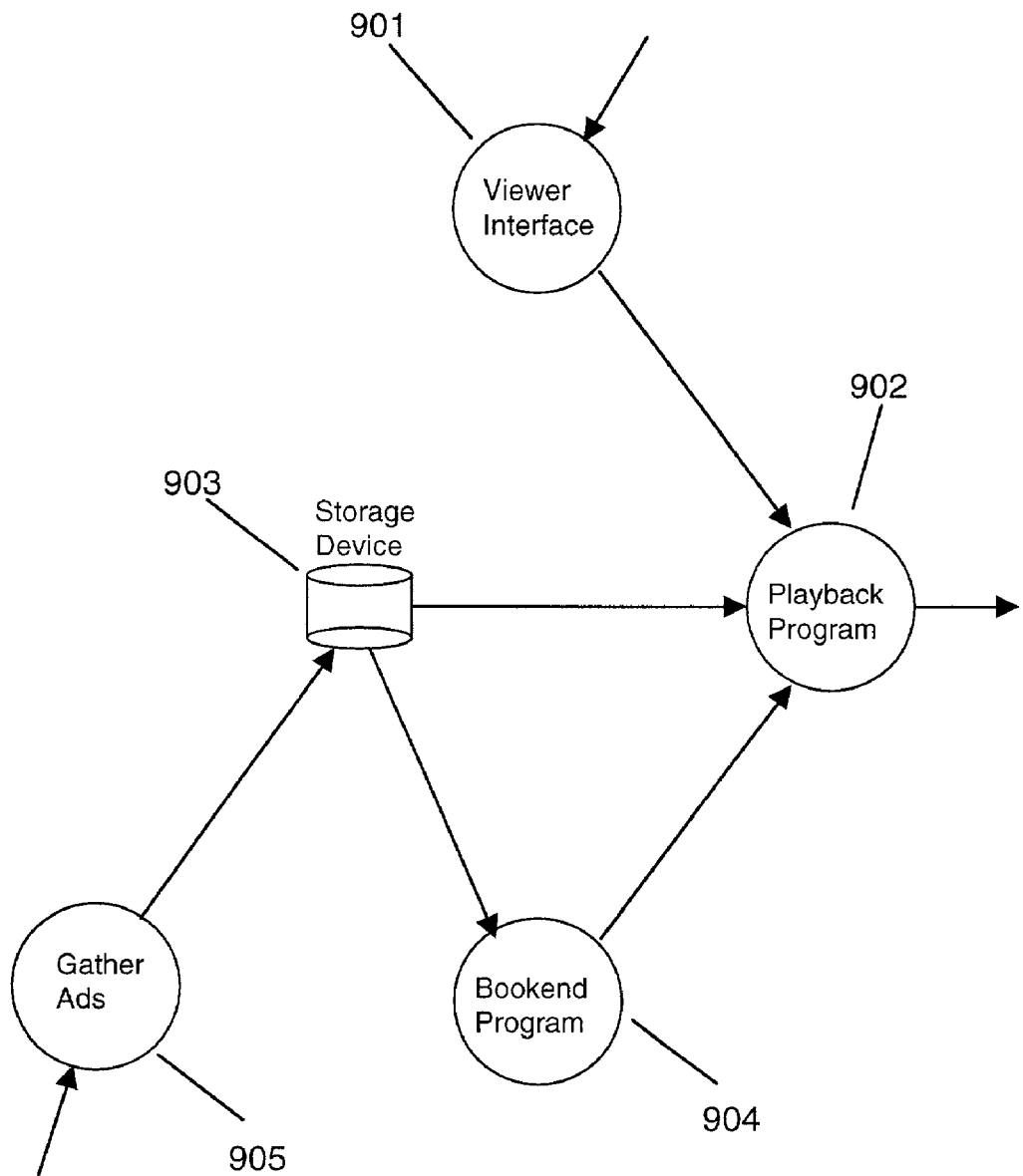
FIG. 9 is a block schematic diagram of high level task viewpoint of a preferred embodiment of the invention implementing the bookending function according to the invention.

With respect to FIG. 9, the invention stores program material and ads on the storage device 903. The Viewer Interface module 901 displays the list of stored programs to the viewer and accepts the viewer program selections. The Playback Program module 902 finds and extracts the selected program from the Storage Device 903.

Bookending ads are selected by the Bookend Program module 904. The Bookend Program module 904 decides whether to display an ad before and/or after the program material—configurable by the DVR service provider. Each ad is selected from the Storage Device 903 by the Bookend Program module 904.

The Playback Program module 902 makes a request to the Bookend Program module 904 for an ad to display. The request is made before and after the Playback Program module 902 displays the program material. If an ad is passed to the Playback Program module 902 by the Bookend Program module 904, then it is displayed. Otherwise, the Playback Program module 902 continues on without displaying an ad.

Since the DVR system knows the viewer's program preferences (e.g., science fiction, police dramas) and, possibly, the viewer's personal information (e.g., male, age 27, likes photography), ads can be selected by the Bookend Program module 904 based on this information. The Bookend Program module 904 selects ads targeted to the specific audience that the viewer is a part of. This allows the DVR service provider to charge advertisers for targeted advertising which is much more valuable than shotgun advertising that occurs in normal television commercial breaks.

Ads are downloaded onto the Storage Device 903 via a modem, Ethernet, recorded at a predetermined time from an input source, etc. by the Download Ads module 905. The DVR can request ads from a central server or record certain groups of ads for the viewer's target audience.

Although the invention is described herein with reference to the preferred embodiment, one skilled in the art will readily appreciate that other applications may be substituted for those set forth herein without departing from the spirit and scope of the present invention. Accordingly, the invention should only be limited by the claims included below.

The invention claimed is:

1. A method for enhancing viewership of television advertisements, comprising:
   receiving, by a digital video recorder (DVR), a program segment containing a commercial break;
   playing the program segment to a viewer;
   detecting, by the DVR, an in-band signal associated with the program segment, the in-band signal containing information about each of the commercials in the commercial break;
   in response to detecting the in-band signal:
      creating, by the DVR, a menu based on the information contained in the in-band signal about each of the commercials in the commercial break;
      displaying, by the DVR, the menu; and
      while displaying the menu, pausing playback of the program segment by the DVR and a user is allowed to select between skipping past the menu to continue viewing the program segment and selecting a particular item in the menu.

2. The method of claim 1, wherein the in-band signal comprises a tag that triggers the DVR to display the menu; and wherein the tag includes information to be displayed in the menu.

3. The method of claim 1, wherein the pausing step is triggered by the DVR upon detection of an in-band signal.

4. An apparatus, comprising:
   one or more processors;
   a receiving subsystem that receives, by a digital video recorder (DVR), a program segment containing a commercial break;
   a playing subsystem that plays the program segment to a viewer;
   a detecting subsystem in the DVR that detects an in-band signal associated with the program segment, the in-band signal containing information about each of the commercials in the commercial break;
   responsive to detecting the in-band signal:
      a creating subsystem in the DVR that creates a menu based on the information contained in the in-band signal about each of the commercials in the commercial break;
      a displaying subsystem in the DVR that displays the menu; and
      a pausing subsystem in the DVR that that pauses playback of the program segment while displaying the menu and a user is allowed to select between skipping past the menu to continue viewing the program segment and selecting a particular item in the menu.

5. The apparatus of claim 4, wherein the in-band signal comprises a tag that triggers the DVR to display the menu; and wherein the tag includes information to be displayed in the menu.

6. The apparatus of claim 4, wherein the pausing subsystem is triggered upon detection of an in-band signal.

7. A non-transitory computer-readable medium carrying one or more sequences of instructions which, when executed by one or more processors, causes the one or more processors to perform the steps of:
   receiving, by a digital video recorder (DVR), a program segment containing a commercial break;
   playing the program segment to a viewer;
   detecting, by the DVR, an in-band signal associated with the program segment, the in-band signal containing information about each of the commercials in the commercial break;
   in response to detecting the in-band signal:

creating, by the DVR, a menu based on the information contained in the in-band signal about each of the commercials in the commercial break;

displaying, by the DVR, the menu; and while displaying the menu, pausing playback of the program segment by the DVR and a user is allowed to select between skipping past the menu to continue viewing the program segment and selecting a particular item in the menu.

8. The non-transitory computer-readable medium of claim 7, wherein the in-band signal comprises a tag that triggers the DVR to display the menu; and wherein the tag includes information to be displayed in the menu.

9. The non-transitory computer-readable medium of claim 7, wherein the pausing step is triggered by the DVR upon detection of an in-band signal.

* * * * *